US012508829B2

(12) United States Patent
Oshima

(10) Patent No.: US 12,508,829 B2

(45) Date of Patent: Dec. 30, 2025

(54) INKJET PRINTING APPARATUS AND HEAD INSPECTION METHOD

(71) Applicant: SCREEN Holdings Co., Ltd., Kyoto (JP)

(72) Inventor: Yasushi Oshima, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 141 days.

(21) Appl. No.: 18/607,852

(22) Filed: Mar. 18, 2024

(65) Prior Publication Data

US 2024/0326495 A1 Oct. 3, 2024

(30) Foreign Application Priority Data

Mar. 27, 2023 (JP) ................................ 2023-049207

(51) Int. Cl.

*B41J 2/045* (2006.01)
*B41J 29/393* (2006.01)

(52) U.S. Cl.

CPC ......... *B41J 29/393* (2013.01); *B41J 2/04581* (2013.01); *B41J 2/04588* (2013.01); *B41J 2029/3935* (2013.01)

(58) Field of Classification Search

CPC .. B41J 2/0451; B41J 2/04588; B41J 2/04596; B41J 2/04598; B41J 29/393; B41J 2029/3935

See application file for complete search history.

(56) References Cited

U.S. PATENT DOCUMENTS

2008/0231669 A1* 9/2008 Brost ......................... B41J 2/03 347/75
2020/0180326 A1 6/2020 Muramatsu

FOREIGN PATENT DOCUMENTS

EP 1627739 A2 * 2/2006 .......... B41J 2/04586
EP 4070961 A1 * 10/2022 ................ B41J 2/01
JP 2020-93399 A 6/2020

* cited by examiner

*Primary Examiner* — Scott A Richmond
(74) *Attorney, Agent, or Firm* — Rimon P.C.

(57) ABSTRACT

A controller for an inkjet printing apparatus outputs a test drive signal for printing a test pattern to a piezoelectric element of a head. The test drive signal includes a first frequency corresponding portion in which first and second waveforms are combined in a first ratio, and a second frequency corresponding portion in which the first and second waveforms are combined in a second ratio different from the first ratio. This allows printing of a test pattern in which a drive frequency is changed in a pseudo manner while a recording medium is transported at a constant speed. Thus, the head is inspected for abnormalities occurring in response to the drive frequency.

7 Claims, 10 Drawing Sheets

INKJET PRINTING APPARATUS AND HEAD INSPECTION METHOD

RELATED APPLICATIONS

This application claims the benefit of Japanese Application No. 2023-049207, filed on Mar. 27, 2023, the disclosure of which is incorporated by reference herein.

BACKGROUND OF THE INVENTION

Field of the Invention

The present invention relates to a technique for inspecting the state of a head in an inkjet printing apparatus for printing using inkjet technology on a recording medium.

Description of the Background Art

An inkjet printing apparatus for printing an image on a recording medium such as printing paper by ejecting ink from a multiplicity of nozzles provided in a head while transporting the recording medium has heretofore been known. A conventional inkjet printing apparatus is disclosed, for example, in Japanese Patent Application Laid-Open No. 2020-93399.

Some inkjet printing apparatuses are capable of switching the transport speed of the recording medium. In such an inkjet printing apparatus, when the transport speed of the recording medium is switched, the head ejects ink at a drive frequency corresponding to the transport speed of the recording medium. However, there are cases in which the head experiences an abnormal ink ejection state at a specific drive frequency. For example, there are cases in which ink is not ejected or an ink ejection position is improper at a specific drive frequency. There are also cases in which ink is ejected onto locations where ink is not to be ejected at a specific drive frequency.

The conventional printing apparatus has inspected the state of the head at each drive frequency by printing a test pattern multiple times while switching the transport speed of the recording medium. However, this method is inefficient for inspection because the test pattern is printed multiple times. In addition, the multiple printing consumes more recording media and more ink.

SUMMARY OF THE INVENTION

In view of the foregoing, it is therefore an object of the present invention to provide a technique capable of inspecting a head for abnormalities occurring in response to a drive frequency without changing the transport speed of a recording medium.

To solve the aforementioned problem, a first aspect of the present invention is intended for an inkjet printing apparatus for printing using inkjet technology on a recording medium, which comprises: a transport mechanism for transporting the recording medium; a head including at least one nozzle facing the recording medium being transported by the transport mechanism, at least one ink chamber in communication with the nozzle, and at least one piezoelectric element for applying pressure to ink in the ink chamber; and a controller for controlling the transport mechanism and the head, the controller including a drive signal generating part for generating a test drive signal by combining first and second waveforms different from each other in accordance with test pattern data, and an signal output part for outputting the test drive signal to the piezoelectric element, with the recording medium transported at a constant speed by the transport mechanism, the test drive signal including a first frequency corresponding portion in which the first and second waveforms are combined in a first ratio, and a second frequency corresponding portion in which the first and second waveforms are combined in a second ratio different from the first ratio.

A second aspect of the present invention is intended for the inkjet printing apparatus of the first aspect, wherein each of the first waveforms is an ejection waveform for ejecting an ink droplet from the nozzle, and wherein each of the second waveforms is a micro-vibration waveform for micro-vibrating the ink in the ink chamber without ejecting an ink droplet from the nozzle or a stop waveform for stopping the piezoelectric element.

A third aspect of the present invention is intended for the inkjet printing apparatus of the first aspect, wherein each of the first waveforms is a micro-vibration waveform for micro-vibrating the ink in the ink chamber without ejecting an ink droplet from the nozzle, and wherein each of the second waveforms is a stop waveform for stopping the piezoelectric element.

A fourth aspect of the present invention is intended for the inkjet printing apparatus of the second or third aspect, wherein an interval between the first waveforms in the second frequency corresponding portion is longer than an interval between the first waveforms in the first frequency corresponding portion.

A fifth aspect of the present invention is intended for the inkjet printing apparatus of any one of the first to fourth aspects, wherein the controller includes a reference signal generating part for generating a reference signal having a frequency corresponding to the transport speed of the recording medium, and a waveform generating part for generating the first waveforms and the second waveforms in a cycle defined by the reference signal.

A sixth aspect of the present invention is intended for the inkjet printing apparatus of any one of the first to fifth aspects, wherein the at least one nozzle, the at least one ink chamber, and the at least one piezoelectric element include multiple sets of nozzles, ink chambers, and piezoelectric elements provided in the head, and wherein the signal output part outputs the test drive signal to the piezoelectric elements sequentially at different times.

A seventh aspect of the present invention is intended for a method of inspecting the state of a head in an inkjet printing apparatus for printing on a recording medium by ejecting ink droplets from the head while transporting the recording medium. The method comprises the steps of: (a) generating a test drive signal by combining first and second waveforms different from each other in accordance with test pattern data; and (b) outputting the test drive signal to a piezoelectric element incorporated in the head to eject ink droplets from a nozzle of the head while transporting the recording medium at a constant speed, thereby printing a test pattern on the recording medium, the test drive signal including a first frequency corresponding portion in which the first and second waveforms are combined in a first ratio, and a second frequency corresponding portion in which the first and second waveforms are combined in a second ratio different from the first ratio.

According to the first to seventh aspects of the present invention, the test pattern is printed, with a drive frequency changed in a pseudo manner, while the recording medium is transported at a constant speed. This allows the inspection of the head for abnormalities occurring in response to the drive frequency.

In particular, according to the second aspect of the present invention, the inspection is performed as to whether an abnormality occurs in the ink ejection state or not when the drive frequency of the head is changed.

In particular, according to the third aspect of the present invention, the inspection is performed as to whether erroneous ejection of ink occurs due to micro-vibrations of the ink in the ink chamber or not when the drive frequency of the head is changed.

In particular, according to the sixth aspect of the present invention, patterns are printed sequentially at different times by each nozzle. This makes it easier to identify a nozzle in which an abnormality occurs than simultaneous printing of the test pattern by multiple nozzles.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will now be described with reference to the drawings.

1. Configuration of Inkjet Printing Apparatus

Figure 1:
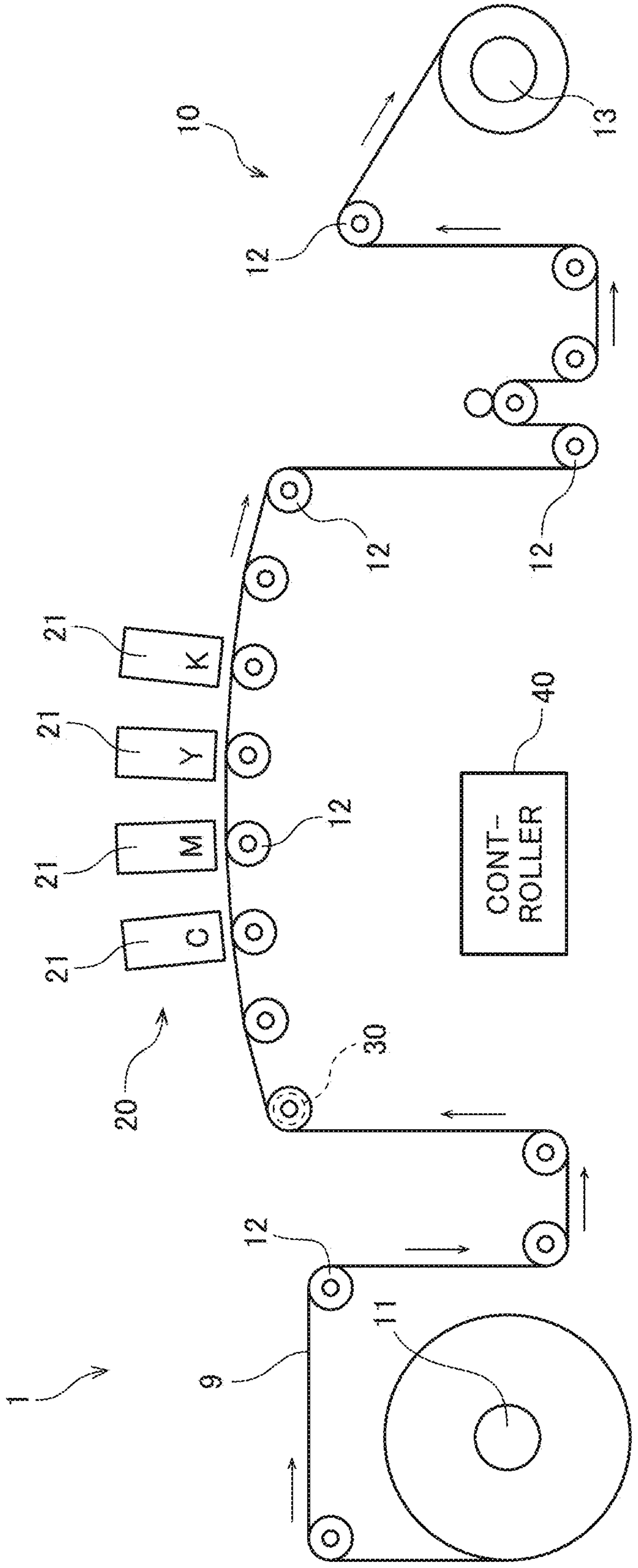
FIG. 1 is a diagram showing a configuration of an inkjet printing apparatus.

FIG. 1 is a diagram showing a configuration of an inkjet printing apparatus 1 according to one preferred embodiment of the present invention. This inkjet printing apparatus 1 is an apparatus for printing using inkjet technology on an elongated strip-shaped recording medium 9. The inkjet printing apparatus 1 prints an image on a surface of the recording medium 9 by ejecting ink from a plurality of heads 21 toward the recording medium 9 while transporting the recording medium 9 in a longitudinal direction thereof. The recording medium 9 may be printing paper or a resin film. As shown in FIG. 1, the inkjet printing apparatus 1 includes a transport mechanism 10, a printing part 20, an encoder 30, and a controller 40.

The transport mechanism 10 is a mechanism for transporting the recording medium 9 along a predetermined transport path. The transport mechanism 10 of the present preferred embodiment includes an unwinder 11, a plurality of transport rollers 12, and a winder 13. The recording medium 9 is unwound from the unwinder 11, and is transported along the transport path formed by the transport rollers 12. Each of the transport rollers 12 rotates about an axis parallel to the width direction of the recording medium 9 to guide the recording medium 9 downstream along the transport path. The "width direction of the recording medium 9" refers to a horizontal direction perpendicular to the transport direction of the recording medium 9. The recording medium 9 runs over the transport rollers 12 while being held under tension. This prevents slack and wrinkles in the recording medium 9 during the transport. After the transport, the recording medium 9 is wound and collected on the winder 13.

The transport mechanism 10 includes a motor (not shown) for rotating some of the rollers. These rollers rotated by the motor are referred to hereinafter as "drive rollers". The drive rollers are disposed at a plurality of locations along the transport path. When the inkjet printing apparatus 1 is in operation, the motor drives the drive motors to rotate. This causes the recording medium 9 to be transported from the unwinder 11 toward the winder 13. The transport mechanism 10 is capable of adjusting the tension applied to the recording medium 9 by adjusting the rotation speed of the drive rollers.

The printing part 20 is a unit for ejecting droplets of ink toward the recording medium 9 being transported by the transport mechanism 10. The printing part 20 of the present preferred embodiment includes four heads 21. The heads 21 are arranged in spaced apart relation in the transport direction of the recording medium 9. The recording medium 9 is transported under the four heads 21, with a printing surface thereof facing upward.

Figure 2:
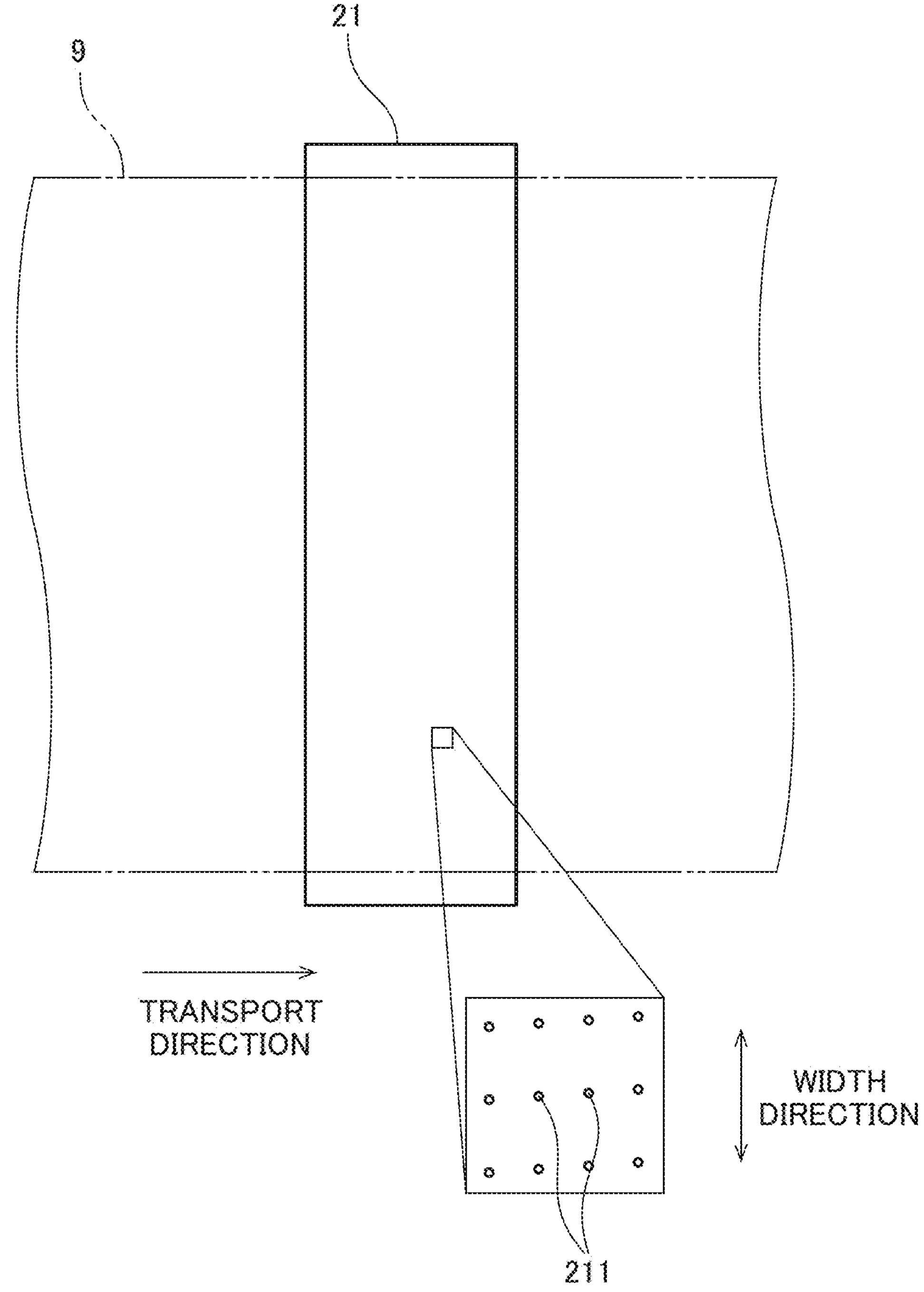
FIG. 2 is a bottom view of one head.

FIG. 2 is a bottom view of one head 21. In FIG. 2, the recording medium 9 is shown in imaginary lines (dash-double-dot lines). As shown on an enlarged scale in FIG. 2, the head 21 has a lower surface provided with a plurality of nozzles 211 capable of ejecting droplets of ink. In the present preferred embodiment, the nozzles 211 are arranged two-dimensionally in the transport direction and in the width direction in the lower surface of the head 21. The nozzles 211 are displaced in relation to each other in the width direction. Such a two-dimensional arrangement of the nozzles 211 allows the nozzles 211 to be positioned closer to each other in the width direction. However, the nozzles 211 may be aligned in a line in the width direction.

Figure 3:
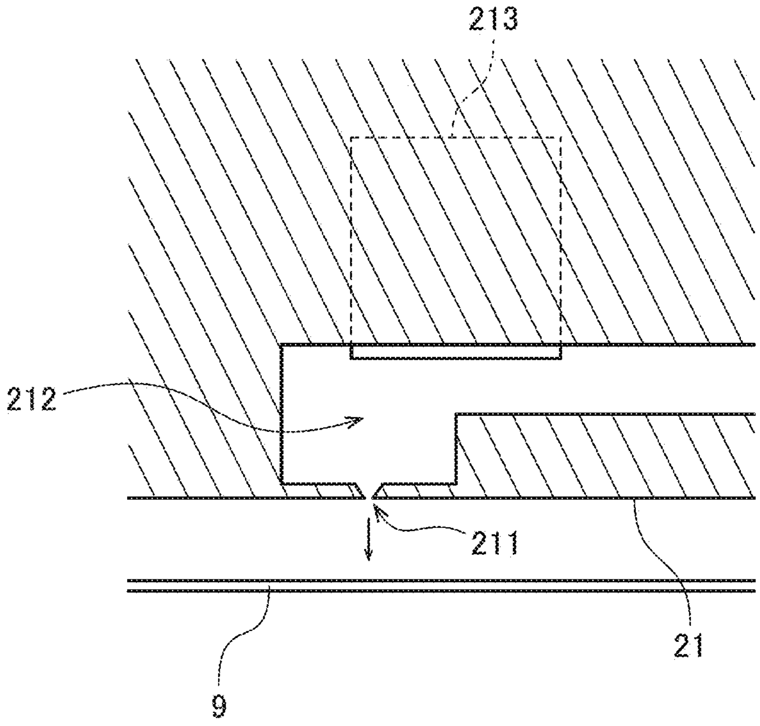
FIG. 3 is a partial vertical sectional view of the head in the vicinity of one nozzle.

FIG. 3 is a partial vertical sectional view of the head 21 in the vicinity of one nozzle 211. As shown in FIG. 3, the nozzle 211 is a hole provided in a lower portion of the head 21. The nozzle 211 vertically faces an upper surface of the recording medium 9 being transported by the transport mechanism 10. The head 21 includes one ink chamber 212 and one piezoelectric element 213 for each nozzle 211. In other words, the head 21 includes multiple sets of nozzles 211, ink chambers 212, and piezoelectric elements 213.

The ink chamber 212 is a cavity in communication with the nozzle 211. Ink is stored in the ink chamber 212 via an ink flow passage not shown. The piezoelectric element 213 is provided in a wall surface of the ink chamber 212. The piezoelectric element 213 extends toward the interior of the ink chamber 212 in response to a drive signal to be described later. This applies pressure to the ink in the ink chamber 212, so that droplets of ink are ejected from the nozzle 211.

The four heads 21 eject droplets of ink of different colors toward the upper surface of the recording medium 9. The four heads 21 eject droplets of ink of four respective colors, e.g. cyan, magenta, yellow, and black, toward the upper surface of the recording medium 9. Then, a multi-color image is recorded on the upper surface of the recording medium 9 by superimposing single-color images formed by the ink of the respective colors.

A drying processing part for drying the ink ejected onto the printing surface of the recording medium 9 may be further provided downstream of the printing part 20 in the transport direction. The drying processing part, for example, blows a heated gas toward the recording medium 9 to vaporize a solvent contained in the ink adhering to the recording medium 9, thereby drying the ink. However, the drying processing part may cure or dry the ink by other methods such as light irradiation.

The encoder 30 is a sensor for detecting the transport speed of the recording medium 9. As shown in FIG. 1, the encoder 30 is connected to one of the transport rollers 12. The encoder 30 outputs a pulse signal s1 once each time the transport rollers 12 rotate through a predetermined angle. Thus, when the recording medium 9 is transported at a constant transport speed, the encoder 30 outputs the pulse signal s1 in a constant cycle corresponding to the transport speed. The pulse signal s1 is sent from the encoder 30 to the controller 40.

Figure 4:
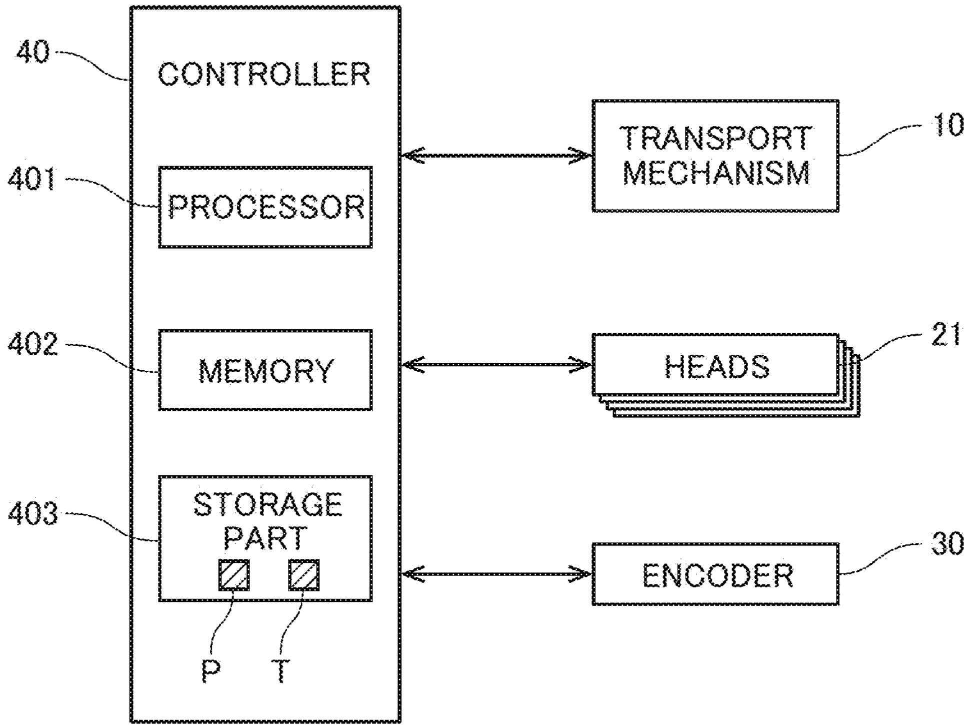
FIG. 4 is a diagram showing electrical connections between a controller and each part of the apparatus.

The controller 40 is an information processing device for controlling the inkjet printing apparatus 1. FIG. 4 is a diagram showing electrical connections between the controller 40 and each part of the inkjet printing apparatus 1. As shown in FIG. 4, the controller 40 is formed by a computer including a processor 401 such as a CPU, a memory 402 such as a RAM, and a storage part 403 such as a hard disk drive. A computer program P for execution of a printing process is stored in the storage part 403. Test pattern data T representing a test pattern to be described later is also stored in the storage part 403.

As shown in FIG. 4, the controller 40 is connected to the transport mechanism 10, the four heads 21, and the encoder 30 described above for communication therewith by wired or wireless means. The controller 40 reads the computer program P from the storage part 403 onto the memory 402 to operate the processor 401 in accordance with the computer program P, thereby controlling each of the aforementioned parts. This causes the transport of the recording medium 9 and the printing process to proceed.

2. Printing of Test Pattern

This inkjet printing apparatus 1 has the function of printing a test pattern on the recording medium 9 for the purpose of inspecting whether the ejection state of ink droplets from the nozzles 211 of the heads 21 is normal or not. This function will be described below.

Figure 5:
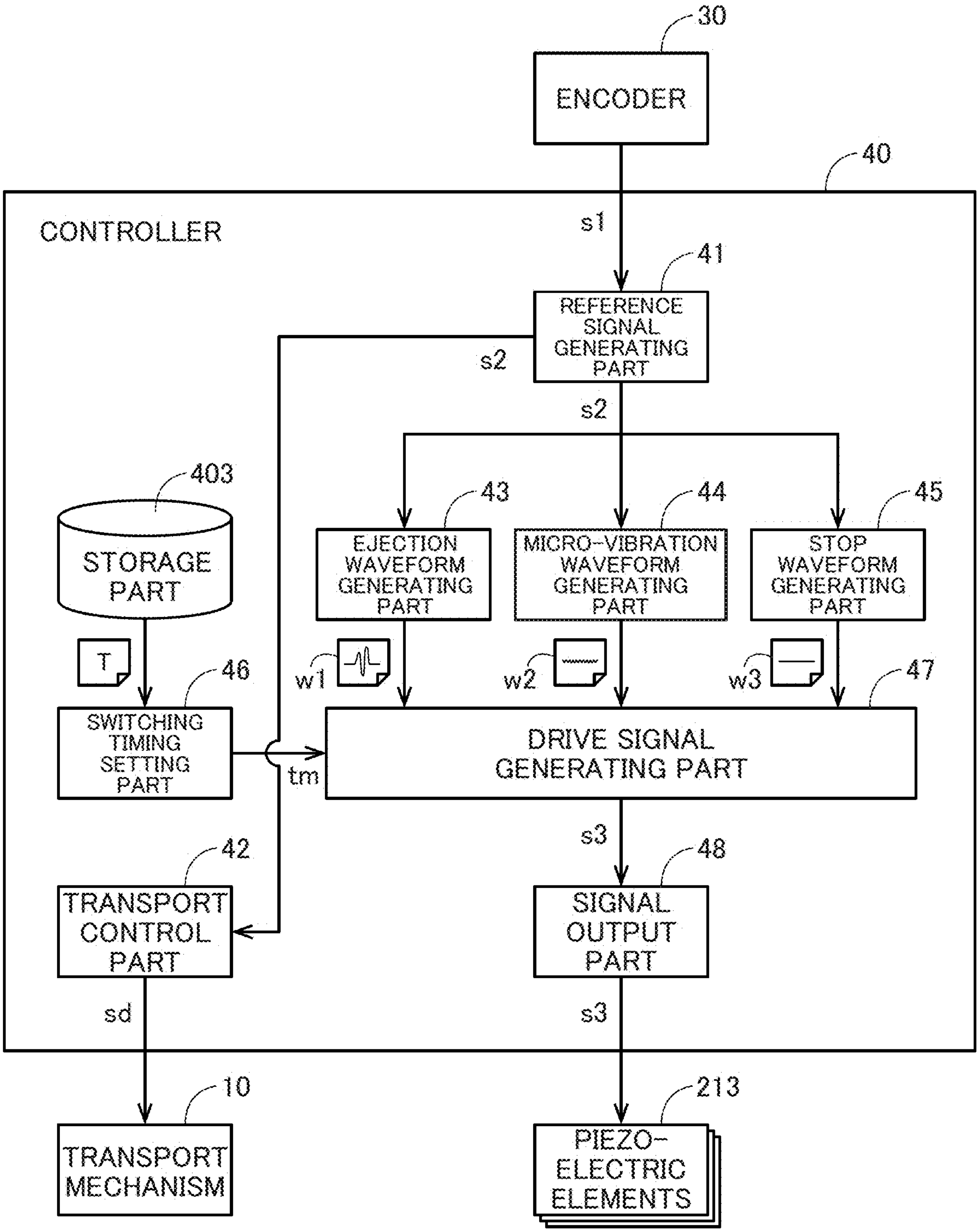
FIG. 5 is a block diagram conceptually showing the functions of the controller.

FIG. 5 is a block diagram conceptually showing the functions of the controller 40 for the printing of a test pattern. As shown in FIG. 5, the controller 40 includes a reference signal generating part 41, a transport control part 42, an ejection waveform generating part 43, a micro-vibration waveform generating part 44, a stop waveform generating part 45, a switching timing setting part 46, a drive signal generating part 47, and a signal output part 48. The functions of the reference signal generating part 41, the transport control part 42, the ejection waveform generating part 43, the micro-vibration waveform generating part 44, the stop waveform generating part 45, the switching timing setting part 46, the drive signal generating part 47, and the signal output part 48 are implemented by the controller 40 operating in accordance with the computer program P.

The reference signal generating part 41 is a processing part for generating a reference signal s2 corresponding to the transport speed of the recording medium 9. The reference signal generating part 41 acquires the pulse signal s1 outputted from the encoder 30. Then, the reference signal generating part 41 frequency-divides the pulse signal s1 to generate the periodic reference signal s2 with a frequency corresponding to the transport speed of the recording medium 9.

The transport control part 42 is a processing part for controlling the operation of the transport mechanism 10. The transport control part 42 supplies a control signal sd to the motor of the transport mechanism 10. The transport control part 42 also adjusts the value of the control signal sd, based on the reference signal s2. This causes the recording medium 9 to be transported at a substantially constant transport speed.

The ejection waveform generating part 43 is a processing part for generating an ejection waveform w1 that is a signal waveform for ejecting ink droplets from the nozzles 211. The ejection waveform generating part 43 generates the ejection waveform w1 in a cycle defined by the reference signal s2. The ejection waveform w1 is a waveform greater in amplitude than a micro-vibration waveform w2 and a stop waveform w3 to be described later. When the ejection waveform w1 is inputted to the piezoelectric elements 213, the piezoelectric elements 213 extend greatly, so that an ink droplet is ejected from the nozzles 211.

The micro-vibration waveform generating part 44 is a processing part for generating the micro-vibration waveform w2 for micro-vibrating the ink in the ink chambers 212 without ejecting ink droplets from the nozzles 211. The micro-vibration waveform generating part 44 generates the micro-vibration waveform w2 in a cycle defined by the reference signal s2. The micro-vibration waveform w2 is a waveform smaller in amplitude than the ejection waveform w1 and greater in amplitude than the stop waveform w3 to be described later. When the micro-vibration waveform w2 is inputted to the piezoelectric elements 213, the piezoelectric elements 213 vibrate with a minute amplitude to cause the ink in the ink chambers 212 to micro-vibrate. This suppresses the solidification of ink in the ink chambers 212 and in the vicinity of the nozzles 211.

The stop waveform generating part 45 is a processing part for generating the stop waveform w3 for stopping the piezoelectric elements 213. The stop waveform w3 is a waveform smaller in amplitude than the micro-vibration waveform w2. The stop waveform w3 may be no signal. When the stop waveform w3 is inputted to the piezoelectric elements 213, the piezoelectric elements 213 stop moving. Thus, no ink droplets are ejected from the nozzles 211, and no micro-vibration of ink is generated in the ink chambers 212.

The switching timing setting part 46 is a processing part for setting the switching timing of the ejection waveform w1, the micro-vibration waveform w2, and the stop waveform w3. The switching timing setting part 46 reads the test pattern data T from the storage part 403. Then, the switching timing setting part 46 sets the switching timing tm of the ejection waveform w1, the micro-vibration waveform w2, and the stop waveform w3 to the drive signal generating part 47 to be described later in synchronism with the reference signal s2 in accordance with the test pattern data T.

Figure 6:
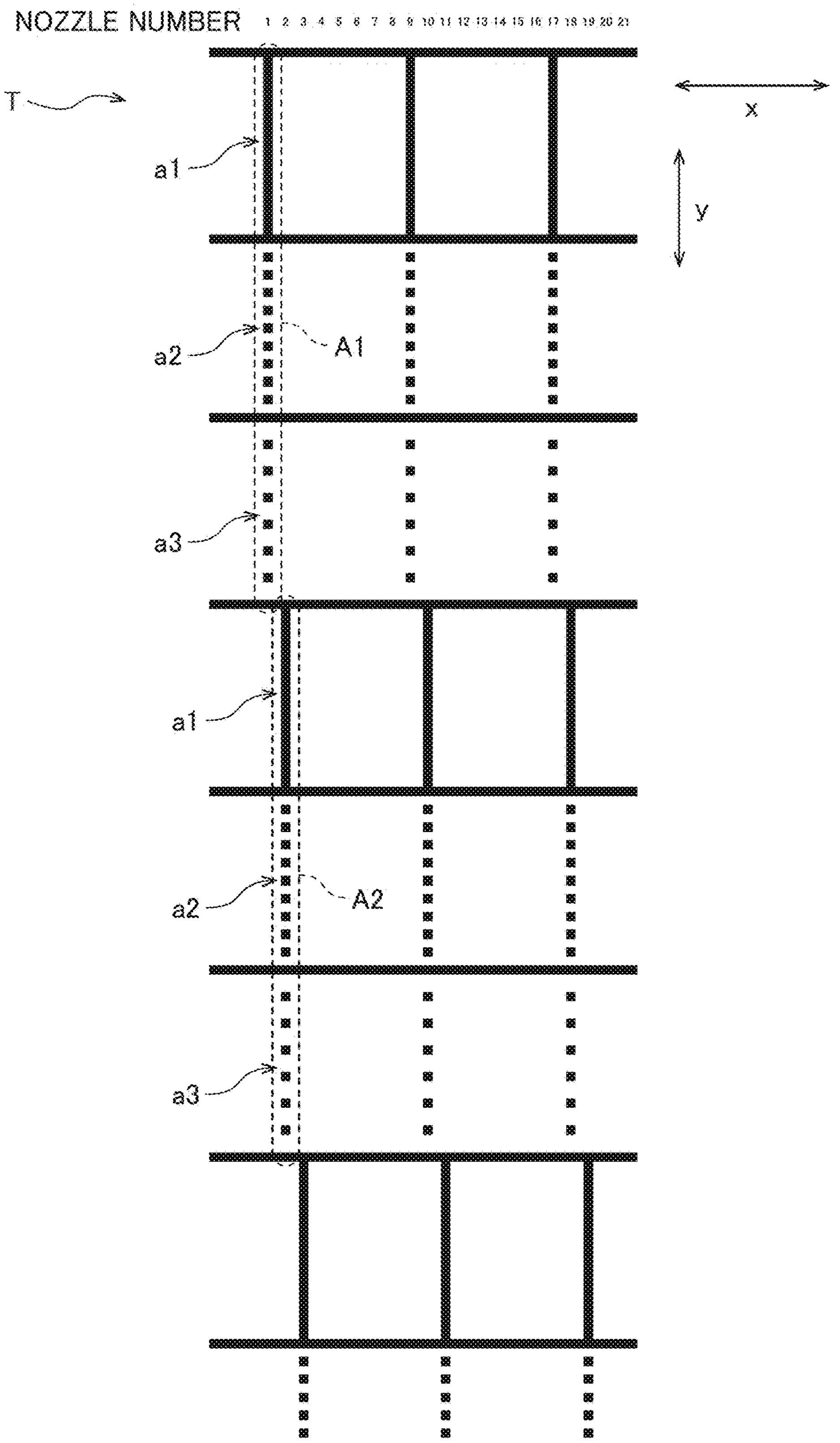
FIGS. 6 and 7 are views showing examples of test pattern data.
Figure 7:
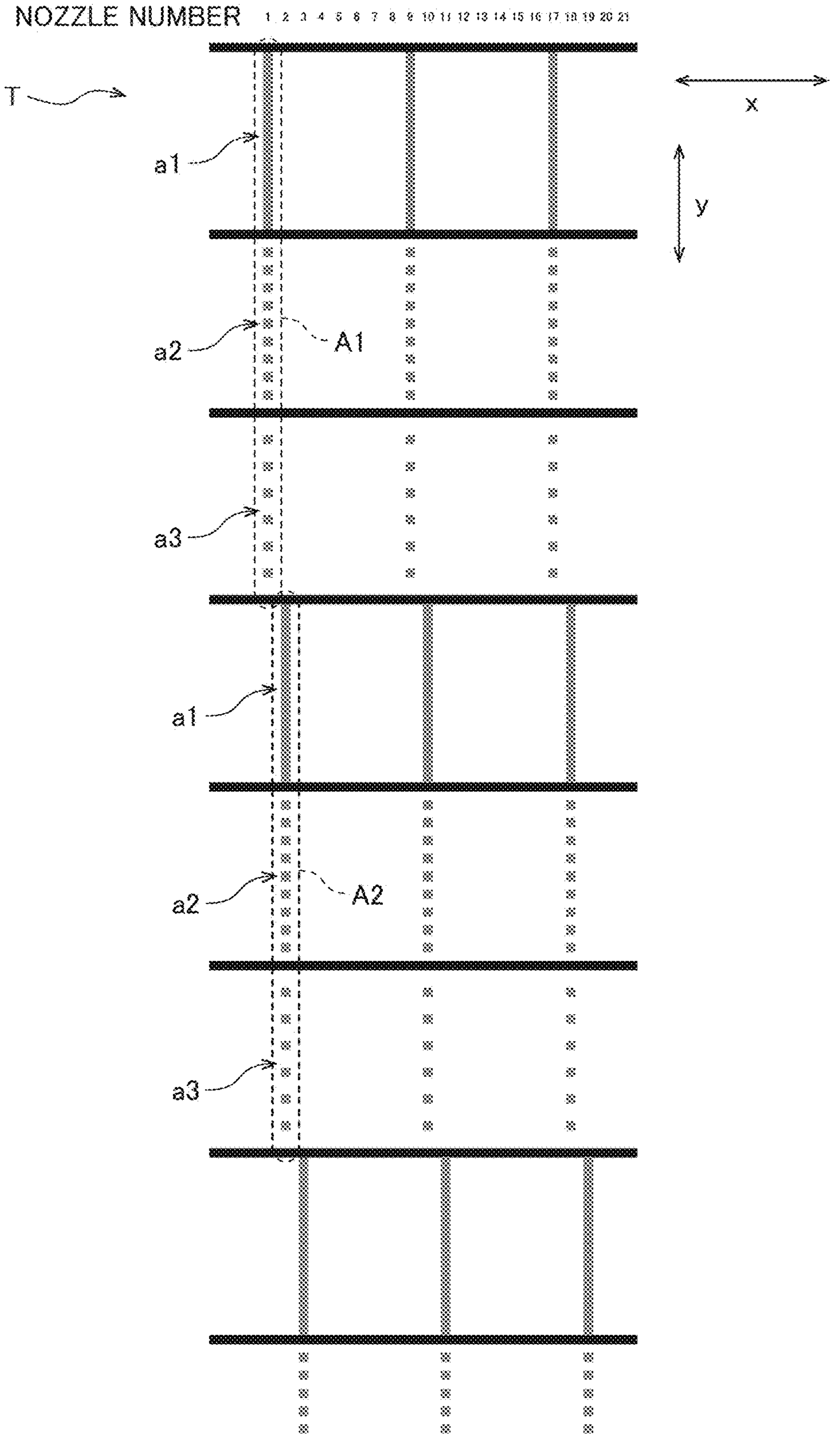

FIG. 6 is a view showing an example of the test pattern data T. FIG. 7 is a view showing another example of the test pattern data T. The test pattern data T represents a test pattern to be printed on the recording medium 9. FIGS. 6 and 7 show only part of the test pattern data T.

The x direction in FIGS. 6 and 7 corresponds to the width direction of the recording medium 9. In other words, the positions as seen in the x direction in FIGS. 6 and 7 represent the positions of the nozzles 211 as seen in the width direction. FIGS. 6 and 7 show the positions of the nozzles 211 numbered 1 through 21. The y direction in FIGS. 6 and 7 corresponds to the transport direction of the recording medium 9. In other words, the positions as seen in the y direction in FIGS. 6 and 7 represent positions as seen in the transport direction of the recording medium 9.

The test pattern data T of FIG. 6 is comprised of black dots and white dots each having one-pixel size. The test pattern data T of FIG. 7 is comprised of black dots, gray dots, and white dots each having one-pixel size.

A black dot denotes the assignment of the ejection waveform w1 in a test drive signal s3 to be described later. In other words, the black dot denotes ejecting an ink droplet from the nozzle 211 at that position. For example, a black dot at a position (x, y) denotes ejecting an ink droplet from the nozzle 211 disposed at the position x as seen in the width direction onto the position y as seen in the transport direction of the recording medium 9.

A gray dot denotes the assignment of the micro-vibration waveform w2 in the test drive signal s3 to be described later. In other words, the gray dot denotes micro-vibrating the ink in the ink chamber 212 without ejecting an ink droplet from the nozzle 211 at that position. For example, a gray dot at a position (x, y) denotes micro-vibrating the ink in the ink chamber 212 for the nozzle 211 disposed at the position x as seen in the width direction without ejecting an ink droplet from that nozzle 211 onto the position y as seen in the transport direction of the recording medium 9.

A white dot denotes the assignment of the stop waveform w3 in the test drive signal s3 to be described later. In other words, the white dot denotes ejecting no ink droplet from the nozzle 211 at that position and micro-vibrating no ink in the ink chamber 212 for the nozzle 211. For example, a white dot at a position (x, y) denotes ejecting no ink droplet from the nozzle 211 disposed at the position x as seen in the width direction onto the position y as seen in the transport direction of the recording medium 9 and micro-vibrating no ink in the ink chamber 212 for that nozzle 211.

A region A1 surrounded by broken lines in FIGS. 6 and 7 is a region for inspecting the ejection state of ink droplets from the nozzle 211 numbered 1. This region A1 includes a 1-fold region a1, a ½-fold region a2, and a ⅓-fold region a3. The 1-fold region a1, the ½-fold region a2, and the ⅓-fold region a3 are arranged in the transport direction.

In the 1-fold region a1 of FIG. 6, black dots are aligned continuously in the y direction. In other words, black and white dots are aligned in a ratio of 1:0 in the 1-fold region a1 of FIG. 6. In the ½-fold region a2 of FIG. 6, one black dot and one white dot are aligned alternately in the y direction. In other words, black and white dots are aligned in a ratio of ½:½ in the ½-fold region a2 of FIG. 6. In the ⅓-fold region a3 of FIG. 6, one black dot and two white dots are aligned alternately in the y direction. In other words, black and white dots are aligned in a ratio of ⅓:⅔ in the ⅓-fold region a3 of FIG. 6.

In the 1-fold region a1 of FIG. 7, gray dots are aligned continuously in the y direction. In other words, gray and white dots are aligned in a ratio of 1:0 in the 1-fold region a1 of FIG. 7. In the ½-fold region a2 of FIG. 7, one gray dot and one white dot are aligned alternately in the y direction. In other words, gray and white dots are aligned in a ratio of ½:½ in the ½-fold region a2 of FIG. 7. In the ⅓-fold region a3 of FIG. 7, one gray dot and two white dots are aligned alternately in the y direction. In other words, gray and white dots are aligned in a ratio of ⅓:⅔ in the ⅓-fold region a3 of FIG. 7.

A region A2 surrounded by broken lines in FIGS. 6 and 7 is a region for inspecting the ejection state of ink droplets from the nozzle 211 numbered 2. Like the region A1, the region A2 includes the 1-fold region a1, the ½-fold region a2, and the ⅓-fold region a3. However, the region A1 for inspecting the nozzle 211 numbered 1 and the region A2 for inspecting the nozzle 211 numbered 2 are displaced from each other as seen in the y direction.

In the test pattern data T, the regions for inspecting adjacent ones of the nozzles 211 are located in different positions as seen in the y direction in this manner. This causes patterns for inspecting the adjacent nozzles 211 to be printed in different positions as seen in the transport direction in the test pattern printed on the recording medium 9. Thus, if there is an abnormality in a printed pattern, it is easy to determine which of the adjacent nozzles 211 is responsible for the abnormality.

Referring again to FIG. 5, the switching timing setting part 46 reads such test pattern data T from the storage part 403 to set the switching timing tm of the three waveforms w1 to w3 in accordance with the test pattern data T.

The drive signal generating part 47 is a processing part for generating the test drive signal s3 for printing the test pattern. The drive signal generating part 47 combines the ejection waveform w1 generated by the ejection waveform generating part 43, the micro-vibration waveform w2 generated by the micro-vibration waveform generating part 44, and the stop waveform w3 generated by the stop waveform generating part 45 in accordance with the switching timing tm set by the switching timing setting part 46. This generates the test drive signal s3 obtained by combining at least two of the following waveforms: the ejection waveform w1, the micro-vibration waveform w2, and the stop waveform w3.

Figure 8:
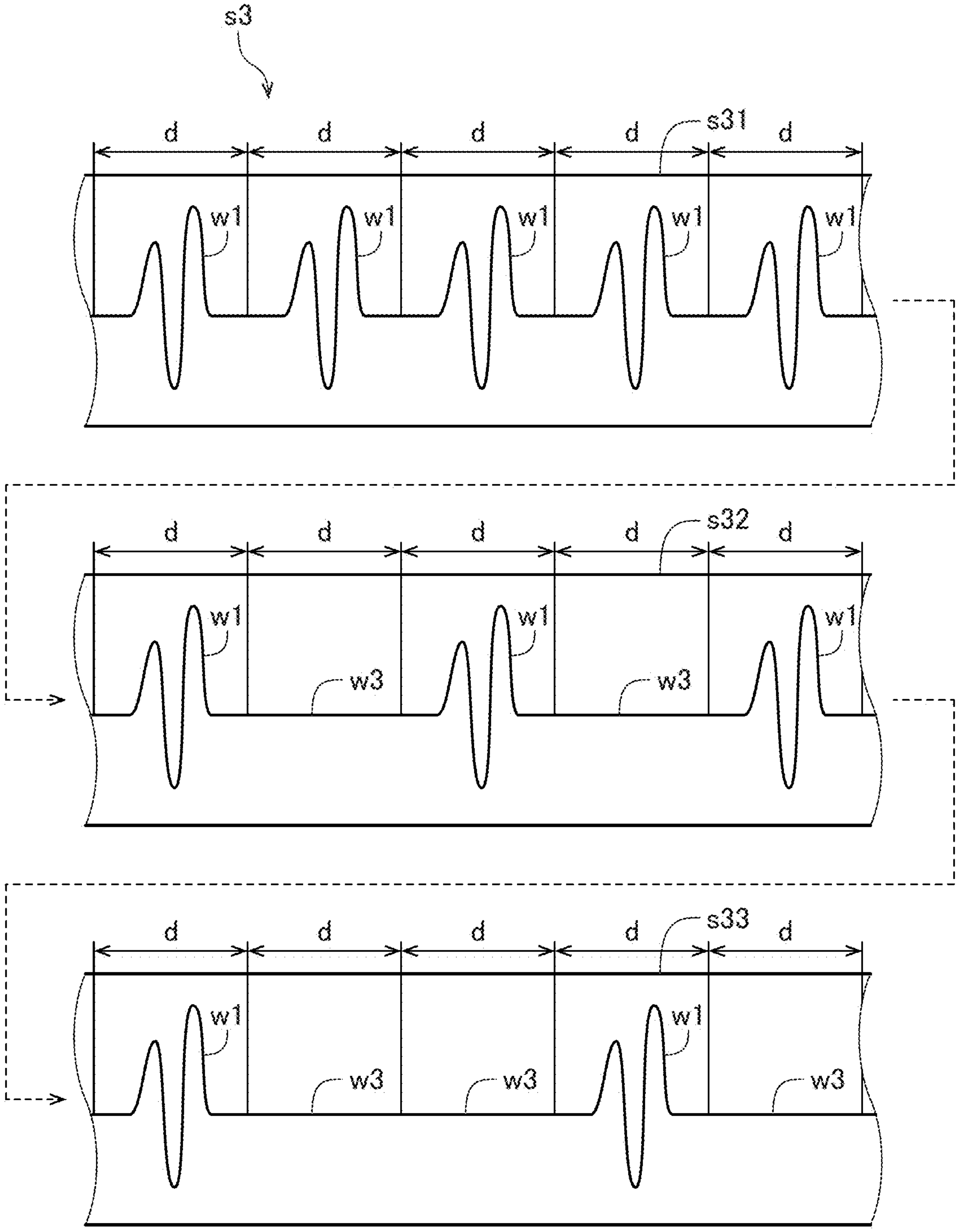
FIG. 8 partially shows a test drive signal for a piezoelectric element for one nozzle, which is generated based on the test pattern data of FIG. 6.
Figure 9:
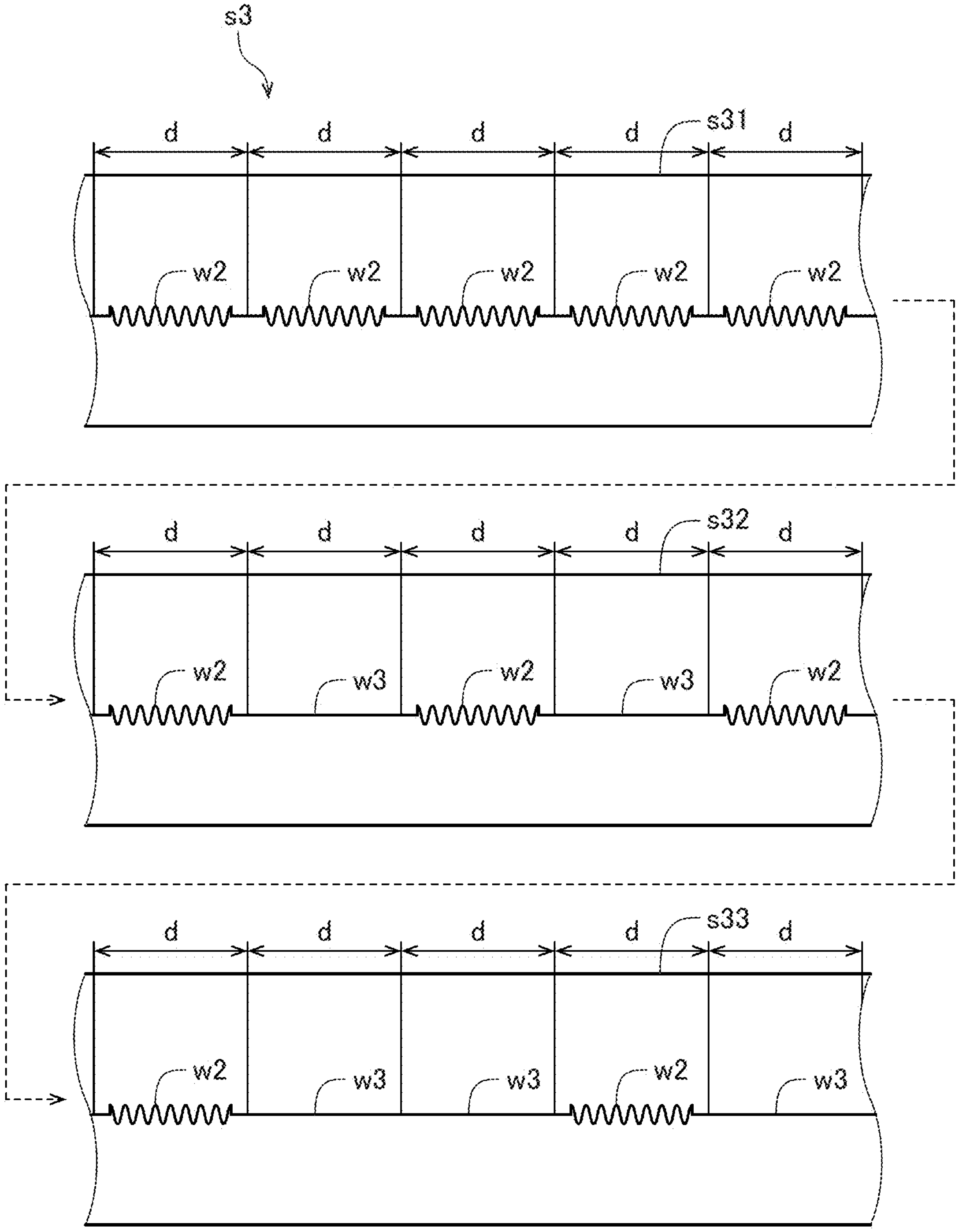
FIG. 9 partially shows a test drive signal for a piezoelectric element for one nozzle, which is generated based on the test pattern data of FIG. 7.

FIG. 8 partially shows the test drive signal s3 for the piezoelectric element 213 for one nozzle 211, which is generated based on the test pattern data T of FIG. 6. FIG. 9 partially shows the test drive signal s3 for the piezoelectric element 213 for one nozzle 211, which is generated based on the test pattern data T of FIG. 7. In FIGS. 8 and 9, the abscissa represents time, and the ordinate represents a signal value (amplitude).

As shown in FIGS. 8 and 9, the test drive signal s3 includes a 1-fold frequency corresponding portion s31, a ½-fold frequency corresponding portion s32, and a ⅓-fold frequency corresponding portion s33. The 1-fold frequency corresponding portion s31 is generated based on the 1-fold region a1. The ½-fold frequency corresponding portion s32 is generated based on the ½-fold region a2. The ⅓-fold frequency corresponding portion s33 is generated based on the ⅓-fold region a3. In FIGS. 8 and 9, a time interval corresponding to one pixel is shown as a "period d".

In the 1-fold frequency corresponding portion s31 of FIG. 8, ejection waveforms w1 each for one pixel are arranged continuously. In the ½-fold frequency corresponding portion s32 of FIG. 8, the ejection waveform w1 for one pixel and the stop waveform w3 for one pixel are arranged alternately. Thus, the interval between the ejection waveforms w1 (the time interval for two periods) in the ½-fold frequency corresponding portion s32 is longer than the interval between the ejection waveforms w1 (the time interval for one period) in the 1-fold frequency corresponding portion s31. In the ⅓-fold frequency corresponding portion s33 of FIG. 8, the ejection waveform w1 for one pixel and successive stop waveforms w3 for two pixels are arranged alternately. Thus, the interval between the ejection waveforms w1 (the time interval for three periods) in the ⅓-fold frequency corresponding portion s33 is longer than the interval between the ejection waveforms w1 (the time interval for two periods) in the ½-fold frequency corresponding portion s32.

In the 1-fold frequency corresponding portion s31 of FIG. 9, micro-vibration waveforms w2 each for one pixel are arranged continuously. In the ½-fold frequency corresponding portion s32 of FIG. 9, the micro-vibration waveform w2 for one pixel and the stop waveform w3 for one pixel are arranged alternately. Thus, the interval between the micro-vibration waveforms w2 (the time interval for two periods) in the ½-fold frequency corresponding portion s32 is longer than the interval between the micro-vibration waveforms w2 (the time interval for one period) in the 1-fold frequency corresponding portion s31. In the ⅓-fold frequency corresponding portion s33 of FIG. 9, the micro-vibration waveform w2 for one pixel and successive stop waveforms w3 for two pixels are arranged alternately. Thus, the interval between the micro-vibration waveforms w2 (the time interval for three periods) in the ⅓-fold frequency corresponding portion s33 is longer than the interval between the micro-vibration waveforms w2 (the time interval for two periods) in the ½-fold frequency corresponding portion s32.

The drive signal generating part 47 generates such a test drive signal s3 for each of the piezoelectric elements 213 for the nozzles 211.

The signal output part 48 outputs the test drive signal s3 generated by the drive signal generating part 47 to the piezoelectric element 213 for each of the nozzles 211. During the inspection of the head 21, the signal output part 48 outputs the test drive signal s3 to each of the piezoelectric elements 213 while the transport mechanism 10 transports the recording medium 9 at a constant speed. This causes ink to be ejected from each of the nozzles 211 of the head 21, thereby printing the test pattern on the upper surface of the recording medium 9.

As described above, the test drive signal s3 includes the 1-fold frequency corresponding portion s31, the ½-fold frequency corresponding portion s32, and the ⅓-fold frequency corresponding portion s33. In other words, the test drive signal s3 includes the three frequency corresponding portions s31 to s33 in which the ejection waveforms w1, the micro-vibration waveforms w2, and the stop waveforms w3 are combined in different proportions.

A pattern to be printed by the 1-fold frequency corresponding portion s31 of FIG. 8 in the test pattern is used to inspect whether an abnormality occurs or not when ink droplets are ejected from the nozzle 211 onto successive pixels while the recording medium 9 is transported at the same transport speed as when printing the test pattern.

A pattern to be printed by the ½-fold frequency corresponding portion s32 of FIG. 8 in the test pattern is used to inspect whether an abnormality occurs or not when ink droplets are ejected from the nozzle 211 onto successive pixels while the recording medium 9 is transported at one-half the transport speed at which the test pattern is printed.

A pattern to be printed by the ⅓-fold frequency corresponding portion s33 of FIG. 8 in the test pattern is used to inspect whether an abnormality occurs or not when ink droplets are ejected from the nozzle 211 onto successive pixels while the recording medium 9 is transported at one-third the transport speed at which the test pattern is printed.

A pattern to be printed by the 1-fold frequency corresponding portion s31 of FIG. 9 in the test pattern is used to inspect whether an abnormality occurs or not when micro-vibrations are generated continuously for successive pixels in the ink chamber 212 for the nozzle 211 while the recording medium 9 is transported at the same transport speed as when printing the test pattern.

A pattern to be printed by the ½-fold frequency corresponding portion s32 of FIG. 9 in the test pattern is used to inspect whether an abnormality occurs or not when micro-vibrations are generated continuously for successive pixels in the ink chamber 212 for the nozzle 211 while the recording medium 9 is transported at one-half the transport speed at which the test pattern is printed.

A pattern to be printed by the ⅓-fold frequency corresponding portion s33 of FIG. 9 in the test pattern is used to inspect whether an abnormality occurs or not when micro-vibrations are generated continuously for successive pixels in the ink chamber 212 for the nozzle 211 while the recording medium 9 is transported at one-third the transport speed at which the test pattern is printed.

The inspection for abnormalities is performed, for example, by an operator visually checking the test pattern. However, a camera provided in the inkjet printing apparatus 1 may be used to photograph the printed test pattern, and the controller 40 may analyze the resulting image to determine whether there is an abnormality or not.

It is determined that there is an abnormality if ink is not ejected on part of the test pattern printed on the recording medium 9 where ink is to be ejected (corresponding to black dots in FIGS. 6 and 7) or if the position of ink ejection is deviated. Examples of the deviation of the ink ejection position include deviation in the width direction, deviation in the transport direction, line bending where the ink ejection positions change gradually, and disorder of the ink ejection positions. It is also determined that there is an abnormality if ink is ejected on part of the test pattern printed on the recording medium 9 where ink is not to be ejected (corresponding to white or gray dots in FIGS. 6 and 7).

As described above, this inkjet printing apparatus 1 is capable of printing a test pattern including a plurality of regions in which the transport speed of the recording medium 9 is changed in a pseudo manner while the recording medium 9 is transported at a constant speed. This allows the inspection of the head 21 for abnormalities occurring in response to the transport speed without actually changing the transport speed of the recording medium 9. Thus, the inspection of the head 21 is performed more rapidly and efficiently than the inspection performed while actually changing the transport speed of the recording medium 9. In addition, the inkjet printing apparatus 1 reduces the amounts of printing paper and ink used, as compared with printing the test pattern multiple times while changing the transport speed.

The test pattern described above is used to inspect whether an abnormality occurs in the head 21 or not when the transport speed of the recording medium 9 is changed. However, the same test pattern may be used to inspect whether an abnormality occurs in the head 21 or not when the resolution of printing is changed without changing the transport speed of the recording medium 9. That is, the aforementioned test pattern may be used to inspect whether an abnormality occurs in the head 21 or not when the drive frequency of the head 21 is changed in response to the transport speed of the recording medium 9 or the resolution of printing.

In the aforementioned preferred embodiment, the test drive signal s3 includes the three types of frequency corresponding portions s31 to s33. However, the number of types of frequency corresponding portions included in the test drive signal s3 may be two or not less than four.

In other words, the test drive signal s3 is required only to include at least a "first frequency corresponding portion" in which "first waveforms" and "second waveforms" are combined in a first ratio (including a 1:0 ratio), and a "second frequency corresponding portion" in which the "first waveforms" and the "second waveforms" are combined in a second ratio (including a 0:1 ratio) different from the first ratio.

In the test drive signal s3 of FIG. 8, the ejection waveforms w1 correspond to the "first waveforms" and the stop waveforms w3 correspond to the "second waveforms". Any two of the 1-fold frequency corresponding portion s31, the ½-fold frequency corresponding portion s32, and the ⅓-fold frequency corresponding portion s33 correspond to the "first frequency corresponding portion" and the "second frequency corresponding portion". The use of the test pattern printed by the test drive signal s3 of FIG. 8 allows the inspection as to whether an abnormality occurs in the ink ejection state or not when the drive frequency of the head 21 is changed. In the test drive signal s3 of FIG. 8, the stop waveforms w3 may be replaced with the micro-vibration waveforms w2.

In the test drive signal s3 of FIG. 9, the micro-vibration waveforms w2 correspond to the "first waveforms" and the stop waveforms w3 correspond to the "second waveforms". Any two of the 1-fold frequency corresponding portion s31, the ½-fold frequency corresponding portion s32, and the ⅓-fold frequency corresponding portion s33 correspond to the "first frequency corresponding portion" and the "second frequency corresponding portion". The use of the test pattern printed by the test drive signal s3 of FIG. 9 allows the inspection as to whether erroneous ejection of ink occurs due to micro-vibrations of the ink in the ink chamber 212 or not when the drive frequency of the head 21 is changed.

In the aforementioned preferred embodiment, the regions for the inspection of adjacent ones of the nozzles 211 are located in different positions as seen in the y direction as in the test pattern data T of FIGS. 6 and 7. For this reason, the signal output part 48 outputs the test drive signal s3 to adjacent ones of the piezoelectric elements 213 sequentially at different times. This causes adjacent ones of the nozzles 211 to print patterns sequentially at different times. Such a process makes the patterns less dense than simultaneous printing of the patterns by the adjacent nozzles 211. It is hence easier to identify a nozzle in which an abnormality occurs.

3. Modifications

While the one preferred embodiment according to the present invention has been described hereinabove, the present invention is not limited to the aforementioned preferred embodiment.

3-1. First Modification

Figure 10:
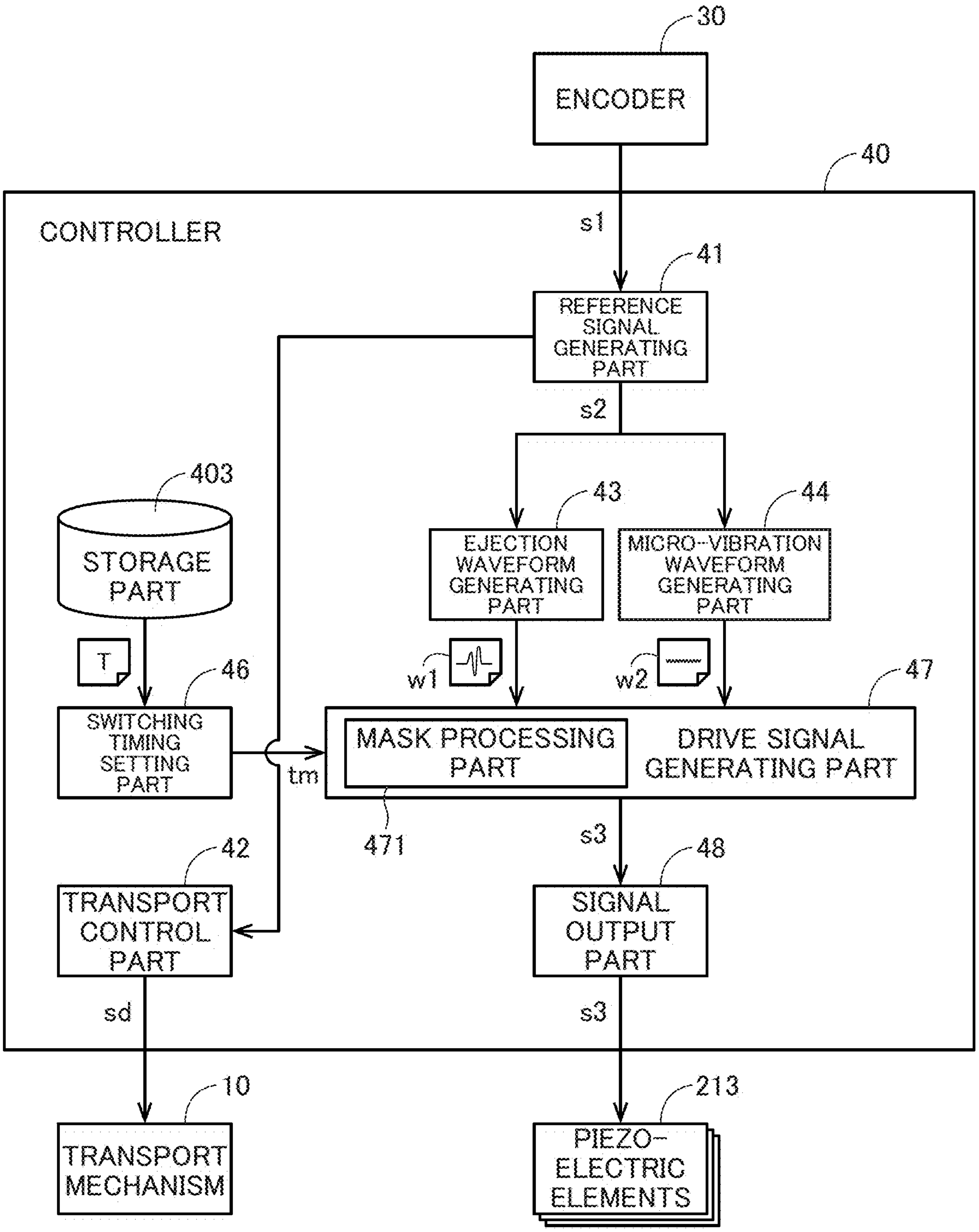
FIG. 10 is a block diagram conceptually showing the functions of the controller according to a modification.

FIG. 10 is a block diagram conceptually showing the functions of the controller 40 according to a first modification. The controller 40 of FIG. 10 does not include the stop waveform generating part 45. Instead, the drive signal generating part 47 includes a mask processing part 471 in the modification of FIG. 10. The drive signal generating part 47 first generates an unmasked drive signal by using only the ejection waveforms w1, only the micro-vibration waveforms w2, or a combination of the waveforms w1 and w2. Then, the mask processing part 471 performs partial mask processing on the generated drive signal to generate the test drive signal s3. The mask processing part 471 masks (makes no signal) part of the drive signal in which the piezoelectric element 213 is to be stopped in accordance with the switching timing tm set by the switching timing setting part 46. This allows the test drive signal s3 to incorporate the same stop waveforms w3 as in the aforementioned preferred embodiment.

3-2. Second Modification

In the aforementioned preferred embodiment, the reference signal generating part 41, the transport control part 42, the ejection waveform generating part 43, the micro-vibration waveform generating part 44, the stop waveform generating part 45, the switching timing setting part 46, the drive signal generating part 47, and the signal output part 48 shown in FIG. 5 are implemented by reading the computer program P from the storage part 403 onto the memory 402 and operating the processor 401 in accordance with the computer program P. However, some or all of these parts 41 to 48 may be implemented by purpose-built electrical circuitry.

3-3. Other Modifications

The inkjet printing apparatus 1 of the aforementioned preferred embodiment includes the four heads 21. However, the number of heads 21 provided in the inkjet printing apparatus 1 may be in the range of one to three, or not less than five. For example, the inkjet printing apparatus 1 may include a head for ejecting ink of a spot color in addition to those for C, M, Y, and K.

The components described in the aforementioned preferred embodiment and in the modifications may be consistently combined together, as appropriate.

While the invention has been shown and described in detail, the foregoing description is in all aspects illustrative and not restrictive. It is therefore understood that numerous modifications and variations can be devised without departing from the scope of the invention.

What is claimed is:

1. An inkjet printing apparatus for printing using inkjet technology on a recording medium, comprising:

a transport mechanism for transporting said recording medium;

a head including at least one nozzle facing said recording medium being transported by said transport mechanism, at least one ink chamber in communication with said nozzle, and at least one piezoelectric element for applying pressure to ink in said ink chamber; and a controller for controlling said transport mechanism and said head, said controller including a drive signal generating part for generating a test drive signal by combining first and second waveforms different from each other in accordance with test pattern data, and an signal output part for outputting said test drive signal to said piezoelectric element, with said recording medium transported at a constant speed by said transport mechanism, said test drive signal including a first frequency corresponding portion in which said first and second waveforms are combined in a first ratio, and a second frequency corresponding portion in which said first and second waveforms are combined in a second ratio different from said first ratio.

2. The inkjet printing apparatus according to claim 1, wherein each of said first waveforms is an ejection waveform for ejecting an ink droplet from said nozzle, and wherein each of said second waveforms is a micro-vibration waveform for micro-vibrating the ink in said ink chamber without ejecting an ink droplet from said nozzle or a stop waveform for stopping said piezoelectric element.

3. The inkjet printing apparatus according to claim 2, wherein an interval between said first waveforms in said second frequency corresponding portion is longer than an interval between said first waveforms in said first frequency corresponding portion.

4. The inkjet printing apparatus according to claim 1, wherein each of said first waveforms is a micro-vibration waveform for micro-vibrating the ink in said ink chamber without ejecting an ink droplet from said nozzle, and wherein each of said second waveforms is a stop waveform for stopping said piezoelectric element.

5. The inkjet printing apparatus according to claim 1, wherein said controller includes a reference signal generating part for generating a reference signal having a frequency corresponding to the transport speed of said recording medium, and a waveform generating part for generating said first waveforms and said second waveforms in a cycle defined by said reference signal.

6. The inkjet printing apparatus according to claim 1, wherein said at least one nozzle, said at least one ink chamber, and said at least one piezoelectric element include multiple sets of nozzles, ink chambers, and piezoelectric elements provided in said head, and wherein said signal output part outputs said test drive signal to said piezoelectric elements sequentially at different times.

7. A method of inspecting a state of a head in an inkjet printing apparatus for printing on a recording medium by ejecting ink droplets from said head while transporting said recording medium, comprising the steps of:

(a) generating a test drive signal by combining first and second waveforms different from each other in accordance with test pattern data; and (b) outputting said test drive signal to a piezoelectric element incorporated in said head to eject ink droplets from a nozzle of said head while transporting said recording medium at a constant speed, thereby printing a test pattern on said recording medium, said test drive signal including a first frequency corresponding portion in which said first and second waveforms are combined in a first ratio, and a second frequency corresponding portion in which said first and second waveforms are combined in a second ratio different from said first ratio.

* * * * *